Dec. 12, 1967 K. W. COX ETAL 3,357,768
APPARATUS AND METHOD FOR VEIWING PROSPECTIVE MANUFACTURED
RUG PATTERNS AND THE LIKE IN THREE DIMENSIONS
Filed Sept. 17, 1963 2 Sheets-Sheet 1
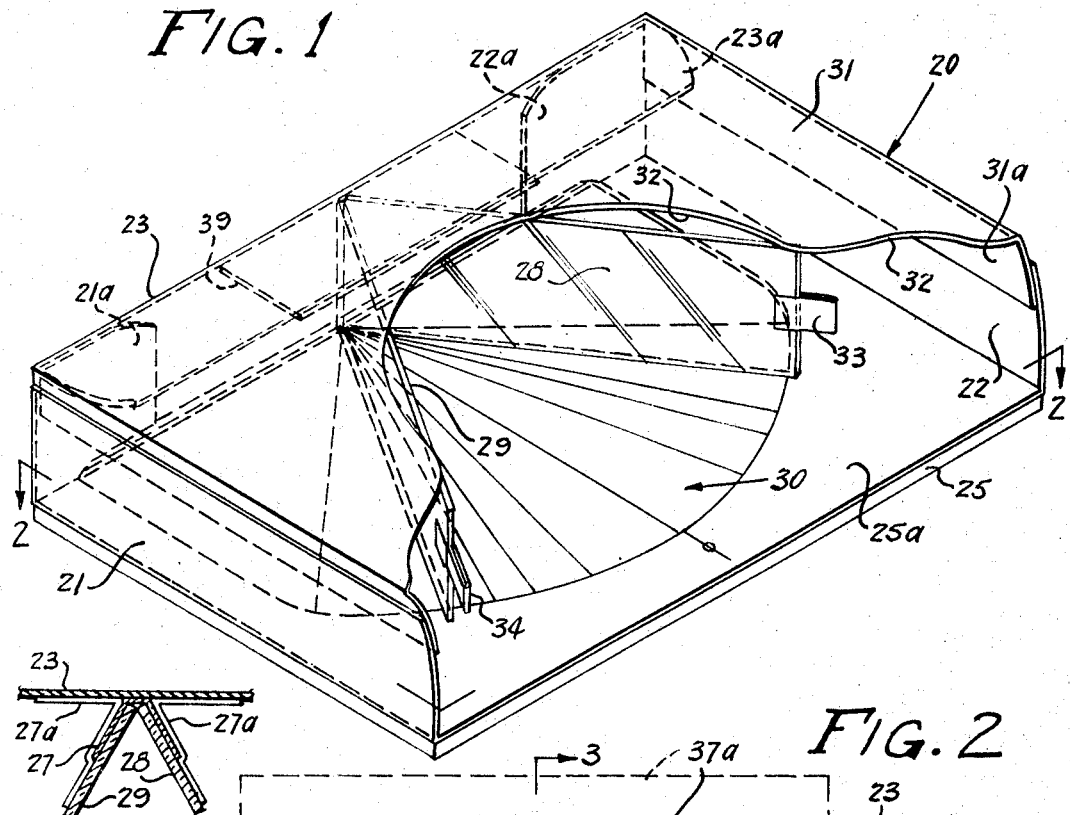
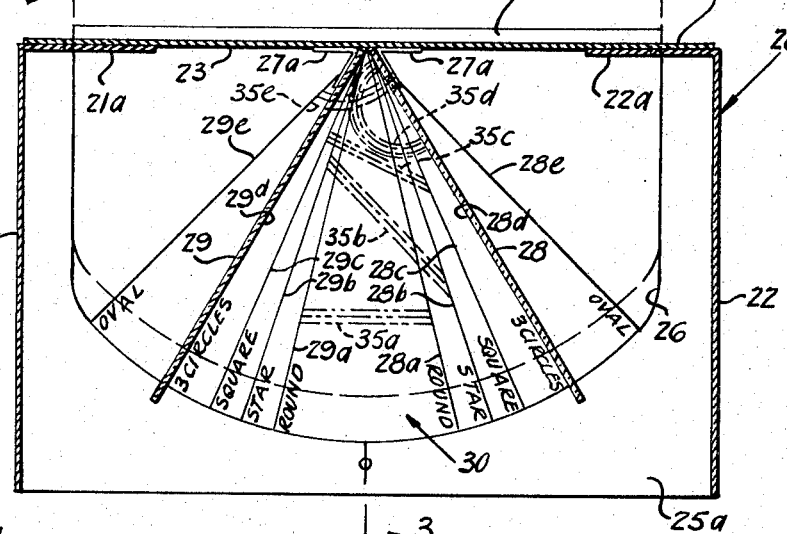
INVENTORS.
KENNETH W. COX
VERNA P. COX
BY
Kimmel & Crowell
ATTORNEYS.

Dec. 12, 1967  K. W. COX ETAL  3,357,768
APPARATUS AND METHOD FOR VEIWING PROSPECTIVE MANUFACTURED
RUG PATTERNS AND THE LIKE IN THREE DIMENSIONS
Filed Sept. 17, 1963  2 Sheets-Sheet 2
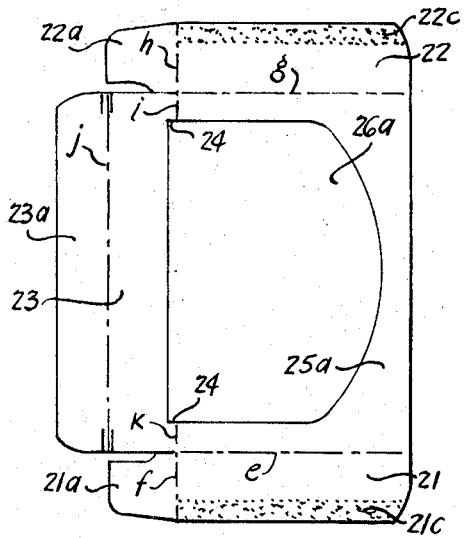
FIG. 5A
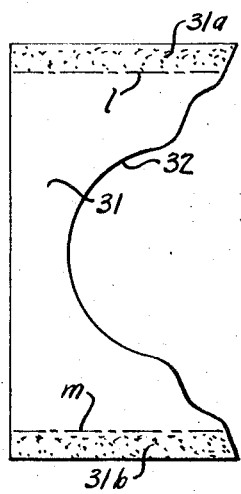
FIG. 5B
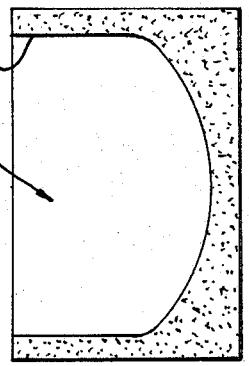
FIG. 5C
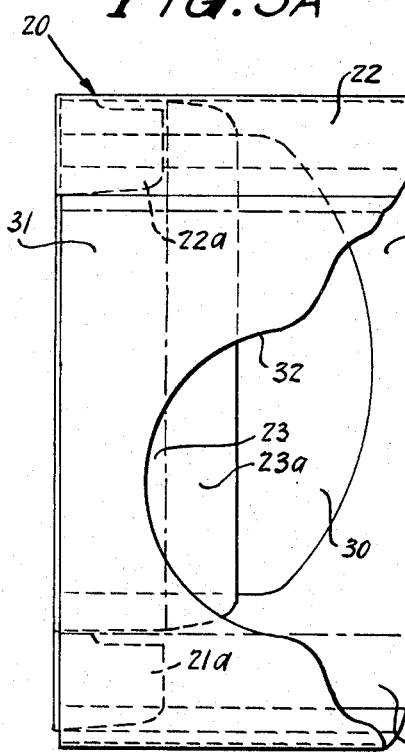
FIG. 6
FIG. 8
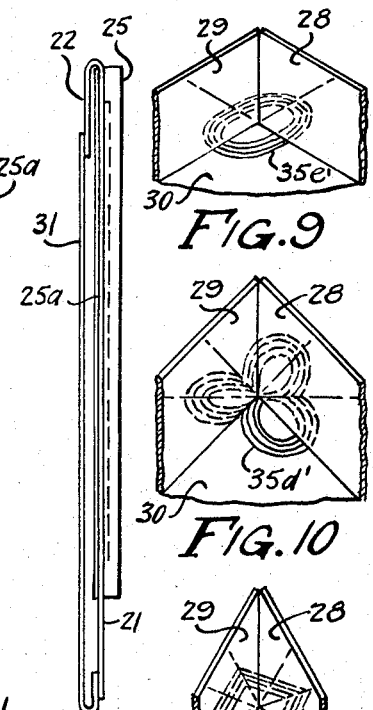
FIG. 9
FIG. 10
FIG. 11
FIG. 12
FIG. 13
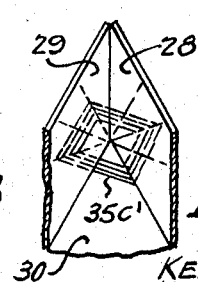
FIG. 7
INVENTORS.
KENNETH W. COX
VERNA P. COX
BY
Kimmel & Crowell
ATTORNEYS.

United States Patent Office 3,357,768
Patented Dec. 12, 1967

3,357,768
APPARATUS AND METHOD FOR VIEWING PROSPECTIVE MANUFACTURED RUG PATTERNS AND THE LIKE IN THREE DIMENSIONS
Kenneth W. Cox and Verna P. Cox, both of R.F.D. 1, Searsport Ave., Belfast, Maine 04915
Filed Sept. 17, 1963, Ser. No. 309,465
3 Claims. (Cl. 350—4)

ABSTRACT OF THE DISCLOSURE

Optical apparatus including a base supported pair of upright confronting planar mirrors disposed at a preselected angle relative to one another on the base in order to obtain a three-dimensional reflected image of a base supported swatch of fabric material simulating a rug in its design and coloring, the swatch being disposed in the angle defined by the mirrors.

This invention relates to an apparatus for viewing prospective projected rug color patterns and the like from small samples of materials or yarns.

In the past, the only way a prospective customer or craftsman could see how a woven rug appear in different colors and shapes was to have such a rug actually made at an expense of time and increase of price, after which, if the rug's color turned out to be disappointing to the customer, the rug would have to be remade with much loss of time and expense to either the customer or craftsman.

In the art of making rugs, the selection of colors is very important. That is, the same selection of colors arranged in a different manner can create a completely different look and feel to the rug. By different arrangement of colors the proposed rug may change from a calm rug to a very bright one; from a soft to a dramatic color style. In the planning of a proposed rug, the braider, or interior decorator wants to design certain things, namely, a soft rug that will complement the room where the rug is used, but will not draw too much attention, or design a bright rug that will cheer up an otherwise drab room. Perhaps the decorator wants to feature a color that would complement the room. Also, perhaps the decorator may want to have a soothing rug in blends that would draw attention, so the color pattern or feel of the rug is critically important to the braider, home and interior decorator. The present invention allows the above people to see all of the above desired features of a proposed rug. That is, a decorator can arrange and rearrange the color swatches over and over again until they have the color pattern effect desired.

The instant invention not only allows the full view of the rug, but it allows the distant look at the rug as one would see it on the floor which is very important in artistic color planning.

The apparatus and the method of this invention are novel in that they enable an interior decorator, prospective customer or craftsman of rugs to instantly see proposed small samples of materials as a completed rug in substantially three dimensions for a particular decor. By varying the included angle of small samples on plan card between a pair of mirrors and adjustment of mirrors, the shape of the sample rug is determined.

It is, therefore, a primary object of this invention to provide an apparatus and method for viewing in substantially three dimensions various prospective color patterns and shapes of completed rug and carpet color patterns from small samples of woven yarn, fabric and the like for color planning.

Another object of this invention is to provide an apparatus and an adjustable and collapsible container therefor for viewing prospective shapes of completed rugs in colors to harmonize with rooms of various colors, shapes, decors, and the like.

A still further object of this invention is to provide a method, container and apparatus for viewing prospective whole woven patterns of material of different color, designs and shapes with a distance view as seen on the floor of a room.

Other objects and advantages of the invention will become apparent to those skilled in the art as will be readily apparent from consideration of the following specification relating to the annexed drawings in which:

FIGURE 1 is a perspective view of the apparatus of the instant invention, in which certain hidden parts are shown in dotted lines;

FIGURE 2 is a sectional view of FIGURE 1 taken on lines 2—2 looking in the direction of the arrows;

FIGURE 3 is a sectional view of FIGURE 2 taken on lines 3—3 looking in the direction of the arrows;

FIGURE 4 is a partial sectional view of the invention showing one means of connecting the mirrows to each other and to the enclosure of the apparatus;

FIGURES 5A, 5B, and 5C are developed views in plan of the cut-out patterns for the component parts of the enclosure, the areas of adhesive material being indicated by stippling;

FIGURE 6 is a plan view of the new apparatus when folded for mailing or shipping;

FIGURE 7 is an end elevational view of the folded housing of the invention;

FIGURE 8 is a side elevational view of the folded housing of the invention;

FIGURE 9 is a fragmentary view of one position of the mirrors of the apparatus of the instant invention showing in three dimensions how an oval rug would be seen therein from small swatches of yarn or materials attached in curved fashion above the plan card;

FIGURE 10 is a three-dimensional view of different swatches of woven yarn or material placed differently on the plan card with the included angle between the mirrors decreased to form a triple-circle pattern;

FIGURE 11 is a three-dimensional view of small swatches of yarn or material or the like on a plan card or film for a four-sided rug as it would be seen with the mirrors of the invention having yet a smaller included angle;

FIGURE 12 shows a star-shaped rug as would be seen in three dimensions from small swatches of material attached to a plan card or film covering between the mirrors of the invention having a still different designated included angle; and FIGURE 13 shows a polygonal or nearly circular shaped rug in three dimensions as viewed by the mirrors of the instant invention.

Other objects and advantages will appear and be brought out more fully in the following specification considered with reference to the accompanying drawings throughout in which like reference numerals designate like parts.

Referring now to the drawings in detail, reference numeral 20 designates the general enclosure means 20 of the apparatus, in which member 21 is a side structure of the enclosure, member 21a is an overlapping folded side portion of member 21, member 22 designates a side of enclosure means 20, member 22a is an overlapping side portion of the enclosure, member 23 is the back means of enclosure 20, and member 23a is a back overhanging means of member 23.

Reference numeral 24 is a slotted aperture as seen particularly in the back wall portion of container 20 of FIG.

3 to receive a plan card 30. Member 25 seen in FIG. 5C is the bottom structure of enclosure 20, and member 25a is an overlap portion of bottom structure 25 as shown in FIG. 5A. Partial recess means 26 is a depression in bottom member 25 to receive a plan card means 30, the portion 26a cut out of the overlap portion 25a serving as a part of the plan card as will be explained in more detail hereinafter.

Hinge means 27 as seen particularly in FIG. 4 serves as a common pivotal means for a mirror means formed of plane mirror members 28 and 29. Hinge means 27 is secured to back member 23 by a desired adhesive tape means 27a.

Top member 31 is secured by overlap means 31a and 31b to side members 21 at 21c and 22c, respectively.

A cutout means 32 in top means 31 of enclosure 20 serves as a clearance means to position mirror means 28 and 29 and to obtain a better clearance for positioning the swatches of cloth within the enclosure 20. Tab means 33 on mirror 28 and tab means 34 on mirror 29 serve as a positioning means to obtain the proper included viewing angle between mirror members 28 and 29.

A plan card means 30 is positioned in recess 26 of bottom member 25. Reference numerals 35a, 35b, 35c, 35d, 35e designate directional placement of small samples of cloth, wool or fabric 35a′, 35b′, 35c′, 35d′, 35e′ (see FIGURES 9 to 13, inclusive) to be viewed between mirror means 28 and 29 above plan card 30 to obtain a three-dimensional view of the material as it would appear when made into a rug of a desired shape and color decor. By varying the angle of the materials on the plan card 30 in addition to varying the included angle between the mirrors, rugs of various designs and shapes can by viewed.

Film means 37 is a transparent film of commercial manufacture with written or instructive information on the underside of the film next to the element 26a removed from overlap portion 25a to form plan means 30. Double sided adhesive tape means 38 of FIG. 3 is placed on top of film means 37 to conveniently and firmly hold the viewing samples on a preselected one of the indicia lines 35a, 35b, 35c, 35d, 35e between mirror members 28 and 29 to view in three dimensions how each sample would look in a prospective rug made in a prescribed size, shape, and color pattern. After viewing, each sample may be easily and quickly removed without damage to the samples or to the plan card 30. The film means 37 includes a tab portion 37a extending beyond element 26a to facilitate inserting and removing plan card 30 through slotted aperture 24.

FIGURE 2 shows in cross-section side means 21 with overlapping side means 21a and side means 22 with overlapping side means 22a. Side overlapping means 21a and 22a fold against back means 23. Member 25 is the rigid bottom means of appropriate thickness which may be integral or laminated as desired. Depression 26 is recessed in the top portion of bottom means 25 and is adapted to receive the plan card 30. Hinge means 27 is secured to a medial portion of back means 23 by adhesive means 27a, the hinge means pivotally connecting mirror means 28 and 29, as more clearly shown in FIG. 4. In FIG. 2 is shown plan card 30 having indicia beneath film means 37 indicating various included angles for mirror means 28 and 29 and other indicia 35a–35e showing placement of the strips of materials thereon for a pre-selected viewing pattern for a desired swatch 35a′–35e′ formed of braided cloth strips, other fabric or wool, as desired. For example, if a round rug pattern is selected to be viewed, mirror means 28 and 29 are then set on radial lines such as 28a–29a having round indicia 35a or the radial lines have an included angle of substantially 28 degrees. If a rug having a star-shaped perimeter is desired, the mirror means 28 and 29 are likewise set to have an included angle of substantially 30 degrees as indicated by lines 28b–29b and 35b designates the shape of the swatches; for a square perimeter an included angle of substantially 47 degrees is used such as shown at 28c–29c and swatches having the shape of 35c is used; for a perimeter having three circles an included angle of substantially 62 degrees is used as indicated by lines 28d–29d and swatches shaped as indicated by indicia 35d is formed; and if a rug perimeter of oval shape is desired an included angle of substantially 90 degrees is used, as shown at 28e–29e, with the swatches being shaped in accordance with 35e. An infinite number of perimeter shapes may be obtained by placing various shapes of swatches of material 35a′–35e′ within the common apex of the inclined angle between mirror members 28 and 29 and varying the angle of the swatches on the card and the included angle between said mirror means.

FIGURE 3 shows in section back means 23, fold overhanging means 23a, slotted aperture 24, bottom means 25, a side of hinge means 27, vertical mirror means 29, cutout 32 of top means 31. Composite bottom means 25 contains recess means 26 which is adapted to receive plan card means 30, through aperture 24 in back means 23. Transparent film means 37 may contain instructive indicia printed on its bottom side and is juxtaposed on, and secured to element 26a to form plan card 30. Double sided adhesive means; means 38 of a commercial manufacture is positioned upon film means 37 as shown and the swatch material 35a′–35e′, inclusive, is selectively positioned on adhesive tape means 38 extending forwardly from the apex of mirror members 28 and 29, within the included angle of the mirror means, as desired.

Pliable foamed plastic means 39, of a commercial manufacture, is secured to the underside of back overhanging means 23a of enclosure 20 and rests on the upper edges of mirror members 28 and 29 for frictionally positioning the mirror means to a selected included angle, as desired. Overhanging means 23a is an extension of back means 23 and is temporarily secured to the underside of top means 31 by tape or other desired means if needed. Such tape is removed to collapse container 20 for shipment.

FIGURE 4 discloses in detail hinge connection means 27, of a desired pliable material, between back means 23 and mirror means 28 and 29 in which a suitable adhesive tape material 27a is used.

FIGURE 5A discloses how side means 21 is hinged along broken line e to bottom overlap means 25a and along broken line f to overlap means 21a. Side means 22 is shown as hinged along broken line g to bottom overlap means 25a and along broken line h with overlap means 22a. Likewise, back means 23 is hinged along broken lines i and k to bottom overlap means 25a, and hinged along broken line j with overhanging means 23a to be secured at assembly to the underside of top means 31. Slotted aperture 24 is formed when element 26a is cut out. All of the above means are manufactured in paper box fashion of being formed in layout form and cut from one piece of flexible cardboard or other desired material.

FIGURE 5B is a layout of top means 31 having overlaps 31a and 31b folded along lines l and m and indicated in stippling to be secured by adhesive to part 22c of side means 22 and part 21c of side means 21, respectively. As explained above, cutout 32 in top means 31 is for convenience of the operator in manipulation of the device and further acts to allow full vision of a rug plan.

FIGURE 5C illustrates the cutout, if desired, of the basic bottom means 25 without line or recess 26 for plan card 30.

FIGURE 6 is a plan view of the folded container 20 after assembly preparatory to its shipment in transit, showing the relative positions of top means 31, bottom overlap means 25a and side means 21 and 22 respectively.

FIGURE 7 is an end elevation view of FIGURE 6 showing the relative folded positions of top means 31 and bottom means 25.

FIGURE 8 is a right side elevation view of FIGURE 6 showing the relative folded positions of said means 21 and 22, bottom means 25, bottom overlap means 25a and top means 25a and top means 31, respectively.

FIGURE 9 is a fragmentary view of one position of mirror means 28 and 29 in association with a small swatch of cloth 35e' on plan card 30 showing how the swatch of cloth would appear as an oval rug in three dimensions.

FIGURE 10 is likewise a three-dimensional view of a different swatch of material as in 35d' with the included angle between mirror means 28 and 29 decreased, resulting in a prospective rug image having a three-circle perimeter, as shown.

FIGURE 11 is a three-dimensional view of a swatch of material 35c' placed as in 35c on plan card 30, at the apex end of the mirrors 28 and 29 having a smaller included angle producing an image of a four sided or square rug in perspective.

FIGURE 12 shows a star-shaped rug image of swatch of material 35b' placed as in 35b on plan card 30 at the apex of a designated included angle between mirror means 28 and 29.

FIGURE 13 discloses a polygonal or substantially circular shaped rug image of swatch of material 35a' placed as in 35a placed within the apex of mirror means 28 and 29 having a designated included angle.

The inventive method of the instant invention for prospective viewing of finished formed carpet and rug patterns and the like in three-dimensional images may be generally summarized in the following successive steps:

Assembling container 20, securing a precut layer of protective film material 37 in juxtaposed position on the top of element 26a to form plan card 30, vertically positioning two plane mirrors 28 and 29 mutually secured by hinge means 27 to the inside medial portion of back means 23, selectively placing a strip of double sided adhesive tape 38 within the apex of an included angle on the plan card 30, placing a swatch of material 35 on adhesive tape 38 at angle selected on plan card, sliding the plan card 30 with a selected one of the swatches 35a'–35c', inclusive secured thereto through slotted aperture 24 into recess 26, adjusting mirror members 28 and 29 to the instructure indicia on plan card 30 or the underside of film means 37 for obtaining a predetermined included angle between the mirror means thereby obtaining a desired geometric floor pattern image of the selected swatch material in three dimensions.

From the foregoing it will now be seen that there is therein provided a novel and new apparatus, method and container which accomplishes all the objects of this invention during use and transit, and others, including many advantages of great practical utility and commercial importance.

As many embodiments may be made of this inventive concept, and as many modifications may be made of the embodiment hereinbefore shown and described, it is to be understood that all matter herein is to be interpreted merely as illustrative, and not in a limiting sense, except as set forth in the following appended claims.

We claim:

1. Apparatus for viewing prospective rug color patterns, designs and the like comprising
   a substantially hollow rectangular container including a normally horizontal bottom member, said bottom member having opposed front and back ends and a pair of opposed sides, said bottom member having a recess formed therein,
   two side members with each fixedly connected, respectively, to one of said opposed sides of said bottom member and projecting upright therefrom,
   a back member fixedly connected to said bottom member at the back end thereof and projecting upright therefrom, said back member having a pair of opposed ends and an elongated slot extending transversely therethrough intermediate its said opposed ends and opening into said recess, said slot being disposed immediately proximate said bottom member, said back member having a portion thereof overhanging said bottom member in vertically spaced relation relative thereto,
   means connecting said opposed ends of said back member with, respectively, the adjacent ends of said side members,
   a top member extending transversely across said bottom member in vertically spaced relation relative thereto, said top members spanning the upper ends of said side members and having a portion thereof superimposed on said extending portion of said back member, said top member having a transversely extending cutout portion formed therein opposed opposite its said superimposed portion,
   means fixedly connecting said top member on said side members;
   said viewing apparatus further including a pair of upright confronting mirror means each having an upper edge and opposed pairs of adjacent ends;
   a first flexible hinged means connecting together one pair of adjacent ends of said mirrors;
   two second flexible hinge means, one means for each end of said one pair of adjacent ends of said mirrors respectively, each of said second flexible hinge means connecting its associated mirror with said back member centrally of the ends of the latter with the other adjacent pair of ends of said mirrors spanning said recess and being spaced vertically therefrom, said other adjacent pair of ends of said mirrors being freely movable towards and away from one another to selectively vary the angle therebetween, said upper edges of said mirrors at their said connected ends being vertically spaced below said overhanging portion of said back member;
   means fixedly secured to said overhanging portion of said back member frictionally engaging said upper edges of said mirrors to hold said mirrors in adjusted angular relationship relative to one another;
   a card slidably exposed in said recess below said mirrors and being insertable therein and removable therefrom through said slot and in directions toward and away from said one connected pair of adjacent ends of said mirrors; and
   means on said card for releasably securing a swatch of material thereon for positioning between the confronting sides of said mirrors.

2. Apparatus as defined in claim 1 wherein said free ends of said mirrors slidably and adjustably engage on and are supported by marginal portions of said bottom member adjacent the periphery of said cutout.

3. Apparatus as defined in claim 2 and manually operable handle means fixedly connected, respectively, to said other ends of said mirrors.

References Cited

UNITED STATES PATENTS

| 169,882 | 11/1875 | Adams | 350—4 |
| 642,121 | 1/1900 | Hildreth | 229—23 |
| 718,326 | 1/1903 | Diem | 88—24 |
| 1,353,629 | 9/1920 | Cibulka | 229—6 |
| 1,706,998 | 3/1929 | Dawson et al. | 350—4 |
| 1,997,882 | 4/1935 | Foss | 229—23 |
| 2,198,051 | 4/1940 | Jordan | 350—4 X |
| 2,758,775 | 8/1956 | Moore | 229—23 |
| 2,900,867 | 8/1959 | Beatman | 350—4 |

FOREIGN PATENTS

| 5,109 | 12/1878 | Great Britain. |
| 353,913 | 6/1961 | Switzerland. |

JEWELL H. PEDERSEN, *Primary Examiner.*

W. A. SKLAR, *Assistant Examiner.*